United States Patent
Yang et al.

(10) Patent No.: US 10,896,486 B2
(45) Date of Patent: Jan. 19, 2021

(54) DENOISING METHOD AND SYSTEM FOR PRESERVING CLINICALLY SIGNIFICANT STRUCTURES IN RECONSTRUCTED IMAGES USING ADAPTIVELY WEIGHTED ANISOTROPIC DIFFUSION FILTER

(71) Applicant: TOSHIBA MEDICAL SYSTEMS CORPORATION, Otawara (JP)

(72) Inventors: Zhi Yang, Beijing (CN); Michael D. Silver, Durango, CO (US)

(73) Assignee: TOSHIBA MEDICAL SYSTEMS CORPORATION, Otawara (JP)

( * ) Notice: Subject to any disclaimer, the term of this patent is extended or adjusted under 35 U.S.C. 154(b) by 822 days.

(21) Appl. No.: 14/567,009

(22) Filed: Dec. 11, 2014

(65) Prior Publication Data

US 2015/0093010 A1   Apr. 2, 2015

Related U.S. Application Data

(62) Division of application No. 12/913,796, filed on Oct. 28, 2010, now Pat. No. 8,938,105.

(51) Int. Cl.
  *G06T 5/00* (2006.01)
  *G06T 7/00* (2017.01)

(52) U.S. Cl.
  CPC ............ *G06T 5/002* (2013.01); *G06T 7/0012* (2013.01); *G06T 2207/10072* (2013.01); *G06T 2207/10081* (2013.01); *G06T 2207/20012* (2013.01); *G06T 2207/20024* (2013.01);
  (Continued)

(58) Field of Classification Search
  CPC ......... G06T 5/002; G06T 5/003; G06T 5/004; G06T 7/0012; G06T 2207/10072; G06T 2207/10081; G06T 2207/20012; G06T 2207/20024; G06T 2207/20182; G06T 2207/20192; G06T 2207/30004
  See application file for complete search history.

(56) References Cited

U.S. PATENT DOCUMENTS

| 4,538,179 A | 8/1985 | Tsutomu et al. |
|---|---|---|
| 6,725,174 B2 | 4/2004 | Bouts et al. |
| 7,660,481 B2 | 2/2010 | Schaap et al. |

(Continued)

FOREIGN PATENT DOCUMENTS

| CN | 1573810 A | 2/2005 |
|---|---|---|
| CN | 101379827 A | 3/2009 |

(Continued)

OTHER PUBLICATIONS

English translation of Japanese Office action, dated Jan. 10, 2017, for corresponding JP Application No. 2016-043575.*

(Continued)

*Primary Examiner* — Vincent Rudolph
*Assistant Examiner* — Timothy Choi
(74) *Attorney, Agent, or Firm* — Kenichiro Yoshida

(57) ABSTRACT

Embodiments and processes of computer tomography perform tasks associated with denoising a reconstructed image using an anisotropic diffusion filter and adaptively weighting an iterative instance of the diffused image based upon the product of a weight value and a difference between the iterative instance of the diffused image and the original image. In general, the adaptive weighting is a negative feedback in the iterative steps.

13 Claims, 4 Drawing Sheets

(52) U.S. Cl.
CPC ............... *G06T 2207/20182* (2013.01); *G06T 2207/20192* (2013.01); *G06T 2207/30004* (2013.01)

(56) References Cited

U.S. PATENT DOCUMENTS

| | | | |
|---|---|---|---|
| 7,756,312 | B2 | 7/2010 | Hsieh et al. |
| 2007/0083114 | A1 | 4/2007 | Yang et al. |
| 2008/0007747 | A1 | 1/2008 | Chinen et al. |
| 2008/0095462 | A1* | 4/2008 | Hsieh .................. G06T 7/0002 382/275 |
| 2008/0234583 | A1 | 9/2008 | Choi |
| 2010/0220939 | A1 | 9/2010 | Tourapis et al. |

FOREIGN PATENT DOCUMENTS

| | | | | |
|---|---|---|---|---|
| JP | 2009-000164 A | | 1/2009 | |
| WO | WO 2009081410 | * | 7/2009 | ............. G06T 5/002 |
| WO | 2010/073251 A2 | | 7/2010 | |

OTHER PUBLICATIONS

Gothandaraman et al., "Total Variation for the Removal of Blocking Effects in DCT Based Encoding", Oct. 2001, IEEE, Proceedings 2001 Int. Conf. on Image Processing, p. 455-458. (Year: 2001).*

Nordstrom, "Biased Anisotropic Diffusion—A Unified Regularization and Diffusion Approach to Edge Detection", Nov. 1990, Elsevier, Image and Vision Computing, vol. 8, is. 4, p. 318-327. (Year: 1990).*

Jan J. Koenderink, et al., "Two-dimensional curvature operators", Journal of the Optical Society of America A, Jul. 1988, pp. 1136-1141, vol. 5, Issue 7, Optical Society of America, Washington DC.

Guido Gerid, et al., "Nonlinear Anisotropic Filtering of MRI Data", IEEE Transactions on Medical Imaging, Jun. 1992, pp. 221-232, vol. 11, Issue 2, IEE, New Jersey.

K. Niklas Nordstrom, "Biased Anisotropic Diffusion: a unified regularization and diffusion approach to edge detection", Image and Vision Computing, Nov. 1990, pp. 318-327, vol. 8, Issue 4, Elsevier B.V., Amsterdam, Netherlands.

Japanese Office Action with its English Summary for the corresponding Japanese Patent Application No. 2011-226114 dated Jun. 16, 2015.

Perona, Pietro and Malik, Jitendra, "Scale-Space and Edge Detection Using Anisotropic Diffusion", IEEE Transactions on Pattern Analysis and Machine Intelligence, vol. 12, No. 7, pp. 629-639 (Jul. 1990).

Catte, Francine; Lions, Pierre-Louis; Morel, Jean-Michael; and Coll, Tomeu; "Image Selective Smoothing and Edge Detection by Nonlinear Diffusion", SIAM Journal on Numerical Analysis, vol. 29, Issue 1, pp. 182-193, (Feb. 1992).

Xu, Yansun; Weaver, John B.; Healy, Jr., Dennis M.; and Lu, Jian; "Wavelet Transform Domain Filters: A Spatially Selective Noise Filtration Technique", IEEE Transactions on Image Processing, vol. 3, No. 6, pp. 747-758, (Nov. 1994).

Weickert, Joachim, "Coherence-Enhancing Diffusion Filtering", International Journal of Computer Vision, 31 (2/3), pp. 111-127, (1999).

Borsdorf, Anja; Raupach, Rainer; Flohr, Thomas; and Hornegger, Joachim, Wavlet Based Noise Reduction in CT-Images Using Correlation Analysis, IEEE Transactions on Medical Imaging, vol. 27, No. 12, pp. 1685-1703, (Dec. 2008).

Schaap, Michiel; Schilham, Arnold M.R.; Zuiderveld, Karel J.; Prokop, Mathias; Vonken, Evert-Jan; and Niessen, Wiro J., "Fast Noise Reduction in Computed Tomography for Improved 3-D Visualization", IEEE Transactions on Medical Imaging, vol. 27, No. 8, pp. 1120-1129, (Aug. 2008).

Xu, Xiaoyin; Miller, Eric L.; Chen, Dongbin; and Sarhadi, Mansoor, "Adaptive Two-Pass Rank Order Filter to Remove Impulse Noise in Highly Corrupted Images", Transactions on Image Processing, vol. 13, No. 2, pp. 238-247, (Feb. 2004).

Czerwinski, Richard N.; Jones, Douglas L.; and O'Brien, William D, Detection of Lines and Boundaries in Speckle Images-Application to Medical Ultrasound, IEEE Transactions on Medical Imaging, vol. 18, No. 2, pp. 126-136, (Feb. 1999).

Weickert, Joachim; Ter Haar Romeny, Bad M.; and Viergever, Max A., "Efficient and Reliable Schemes for Nonlinear Diffusion Filtering", Transactions on Image Processing, vol. 7, No. 3, pp. 398-410, (Mar. 1998).

Extended EP Search Report dated Mar. 26, 2012 for corresponding EP Application No. 11187172.9.

Yang, Zhi et al., "Adaptive Weighted Anisotropic Diffusion for Computed Tomography Denoising", 11th International Meeting on Fully Three-Dimensional Image Reconstruction in Radiology and Nuclear Medicine, Fully 3D, Jul. 11, 2011 (Jul. 11, 2011), pp. 210-213, XP55019216.

Scharr, Hanno et al., "Image statistics and anisotropic diffusion", Proceedings of the Eight IEEE International Conference on Computer Vision. (ICCV). Nice, France, Oct. 13-16, 2003; [International Conference on Computer Vision], Los Alamitos, CA: IEEE Comp. Soc, US, Oct. 13, 2003 (Oct. 13, 2003), pp. 840-847, vol. 2, XP031213134, ISBN: 978-0-7695-1950-0.

* cited by examiner

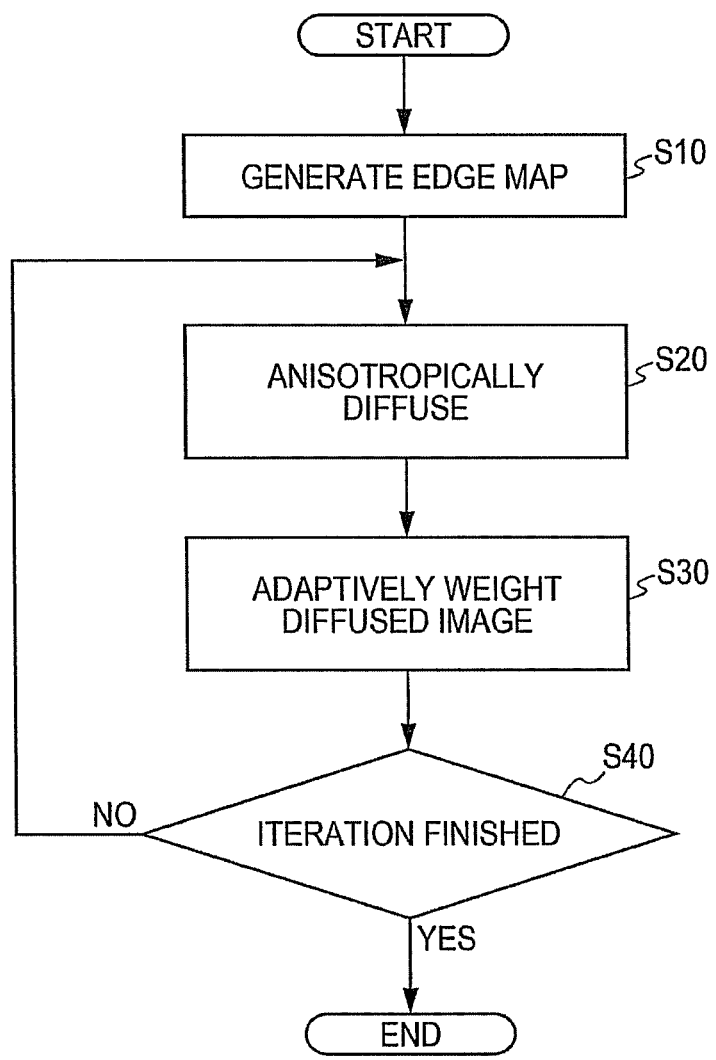

THE FIGURES FOR SHARP AND SLOW EDGES ARE IN THE SAME SCALES.

DENOISING METHOD AND SYSTEM FOR PRESERVING CLINICALLY SIGNIFICANT STRUCTURES IN RECONSTRUCTED IMAGES USING ADAPTIVELY WEIGHTED ANISOTROPIC DIFFUSION FILTER

CROSS REFERENCE TO RELATED APPLICATION

This application is a Divisional Application of U.S. application Ser. No. 12/913,796, filed on Oct. 28, 2010, the entire contents of which are incorporated herein by reference.

FIELD

Embodiments described herein generally relate to denoising in imaging systems and methods.

BACKGROUND

As computed tomography (CT) achieves higher resolution, noise has been a significant problem from the inception of CT imaging. A major concern in developing a denoising technique is to preserve clinically significant structures of interest. In this regard, although low-pass filtering techniques are well-known effective denoising filters, the processed images tend to lose clinically significant structures. That is, low-pass filtering techniques generally remove high frequencies from the image in order to reduce noise for improving the detectability of large objects in the image. On the other hand, the low-pass filters also reduce the intrinsic resolution of the image as they smooth edges and consequently decrease the detectability of small structures.

Some improvements have been made to the low-pass filtering techniques. For example, some prior art low-pass filtering methods average voxels in local neighborhoods that are within an intensity range depending on the estimated standard deviation of noise throughout the image. Other prior art low-pass filtering techniques are based upon the iteratively estimated standard deviation of noise in a particular local position of CT volume for performing a weighted average between neighboring voxels. These noise reduction methods are not particularly aimed at preserving specific structures of interest.

In contrast, a recent CT denoising approach involves anisotropic diffusion as a denoising filter whose diffusion coefficient is made image dependent. Certain image structures can be directionally smoothed with anisotropic diffusion. Since exemplary CT noise reduction methods using anisotropic diffusion improve only certain predetermined structures such as elongated-shaped vessels, these methods are not suited for image enhancement in preserving more general structures or other clinically significant structures in reconstructed CT image data.

Despite computationally complex implementation, anisotropic smoothing techniques have gained attention to reduce noise while preserving structures of interest. While some prior art anisotropic smoothing techniques improved in preserving small structures of interest in image data, these prior art techniques undesirably require to determine an importance map, which indicates potentially relevant structures that should be preserved. Anisotropic diffusion denoising methods and systems thus remain desired to be improved in preserving clinically significant structures in reconstructed images using a variety of modalities including CT and more broadly, multi-dimensional signals.

BRIEF DESCRIPTION OF THE DRAWINGS

FIG. 2 is a flow chart illustrating exemplary steps involved in the adaptively weighed anisotropic diffusion (AWAD) method or process according to the current invention.

DETAILED DESCRIPTION

As described above, the current invention is not limited to CT imaging systems and is applicable to other imaging systems using modalities such as MRI, ultrasound and so on. Although the following embodiments of the current invention are described using CT imaging systems, these embodiments are broadly applicable to multi-dimensional signals.

Figure 1:
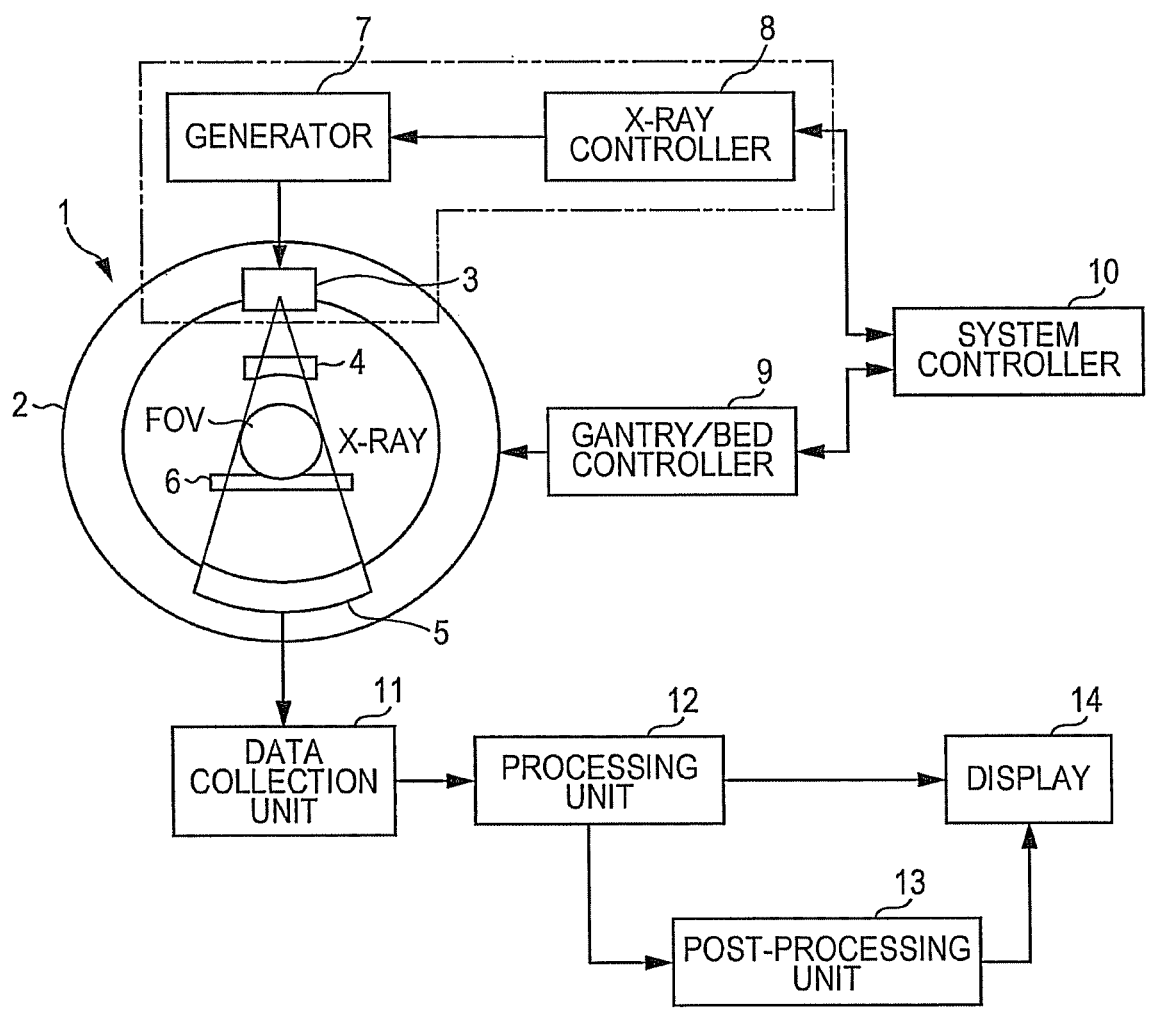
FIG. 1 is a diagram illustrating an x-ray computed topographic imaging system according to the present invention.

FIG. 1 is a diagram illustrating an x-ray computed topographic imaging system according to the present invention. The projection data measurement system includes a gantry 1, which accommodates an x-ray source 3 and a two-dimensional array type x-ray detector 5. The x-ray source 3 and the two-dimensional array type x-ray detector 5 are diametrically installed on a rotating ring 2 across a subject, who is laid on a sliding bed 6. The rotating ring 2 rotates around a predetermined rotational axis while the sliding bed 6 moves along the rotational axis at a predetermined speed. A gantry/bed controller 9 synchronously controls the revolution of the rotating ring 2 and the linear movement of the sliding bed 6. In the following embodiments, projection data is collected while the x-ray source 3 travels either a helical trajectory during a helical data acquisition or a circular trajectory during a circular data acquisition.

The x-ray source 3 emits x-ray flux in a certain configuration such as a cone-beam that is directed onto the subject through an x-ray filter 4. An x-ray controller 8 supplies a trigger signal to a high voltage generator 7, which applies high voltage to the x-ray source 3 upon receiving the trigger signal. Furthermore, a system controller 10 exerts an overall control over both the x-ray controller 8 and the gantry/bed controller 9 so that x-rays are emitted continuously or intermittently at fixed angular intervals from the x-ray source 3 while the rotating ring 2 and the sliding bed 6 are respectively in predetermined rotation and motion.

X-rays that have passed through the subject are detected as electrical signals by the two-dimensional array type x-ray detector 5. In the x-ray detector 5, a plurality of detector elements is arranged in one dimensional row, and a plurality of the rows is stacked to construct a two-dimensional array. In certain situation, each detector element corresponds to one channel. A data collection unit 11 amplifies the output signal from the two-dimensional array type x-ray detector 5 for each channel and converts to a digital signal so as to produce projection data.

A processing unit 12 subsequently performs various processing tasks upon the projection data. For example, the processing unit 12 performs on the projection data desired operation including but not limited to data sampling and shifting, filtering, backprojection and reconstruction.

The processing unit 12 backprojects the projection data in the image domain according to a predetermined algorithm. In general, the backprojected data is weighted by a distance factor. The distance factor is inversely proportional to the distance L from the x-ray source position to the reconstructed pixel. The distance factor can be proportional to $1/L$ or $1/L^2$. Also, some additional data redundancy weighting is optionally applied during the backprojection step on the pixel-by-pixel basis. The backprojection step generally obtains data value corresponding to the ray through the reconstructed pixel by either data interpolation or data extrapolation. This process can be done in a variety of ways.

The processing unit 12 determines backprojection data reflecting the x-ray absorption in each voxel (three-dimensional pixel) in a 3D imaging reconstruction. In a circular scanning system using a cone-beam of x-rays, the imaging region (effective field of view) is of cylindrical shape of radius R centered on the axis of revolution. The processing unit 12 defines a plurality of voxels in this imaging region and finds the backprojection data for each voxel. The three-dimensional image data or tomographic image data is compiled based upon the backprojection data, and the processing unit 12 or other units perform tasks associated with denoising of the reconstructed image data. Finally, a display device 14 displays a three-dimensional image or reconstructed tomography image according to the three-dimensional image data.

According to the current invention, embodiments of the post-reconstruction processing unit 13 perform noise reduction in the 3-D attenuation map or the reconstructed image that is generated from the above described measurements or projection data. In general, the image quality of reconstructed CT images is expected to improve if noise is reduced on and around certain structures provided that the resolution of these structures is at least maintained. Clinically significant structures in CT images include both large structures and small structures. For example, the large structures include bones, the aorta lumen and liver while the small structures include small vessels, calcifications and bronchi.

According to the current invention, embodiments of the post-reconstruction processing unit 13 perform adaptively weighted anisotropic diffusion (AWAD) on the reconstructed images so as to reduce noise while they improve the edge preservation in and around the relevant structures of various sizes. In other words, the noise around both large and small structures is reduced while the edges are better preserved according to the embodiment of the current invention. Furthermore, the AWAD has some advantages over the small structures in reducing the noise while preserving the edges. Although many existing prior art anisotropic diffusion techniques can reduce noise in and around large or relatively slow varying structures, the AWAD brings substantial detail of the image back into the diffused image especially for the small structures.

To understand the embodiments as to how to apply adaptively weighted anisotropic diffusion (AWAD) according to the current invention, a general concept of anisotropic diffusion is first described with respect to the following equations. Anisotropic diffusion is as an extension of the linear diffusion equation by adding a directionally dependent conduction coefficient D as defined in Equation (1a) below:

$$\frac{\delta u}{\delta t} = \nabla \cdot (D(u)\nabla u) \tag{1a}$$

where "•" represents inner product of two vectors and D is diffusion coefficient. A general interpretation of Equation (1a) is that the image u is diffused over time t in voxels, where the diffusion is steered by the diffusion tensor D(u) that is based on local image geometry or gradient $\nabla u$. Equation (1a) states that the intensity change per voxel is equal to the divergence of the intensity gradient after a diffusion tensor transformation. As denoted by $$\frac{\delta u}{\delta t},$$

the anisotropic diffusion technique involves that the image u changes over time t in an iterative fashion (i.e. iteration dependent).

In discrete time format, anisotropic diffusion is defined as follows in Equations (1b) and (1c) to explicitly indicate its iterative nature over time:

$$\frac{u(t_{n+1}) - u(t_n)}{t_{n+1} - t_n} = \nabla \cdot (D\nabla u(t_n)) \tag{1b}$$

$$u(t_{n+1}) = u(t_n) + (t_{n+1} - t_n)[\nabla \cdot (D\nabla u(t_n))] \tag{1c}$$

where u is the processed or diffused image, and $u_0$ is the original image, u is a function of both position and time, $t_n$ and $t_{n+1}$ are respectively the time instances at iteration n and n+1.

As described above, the anisotropic diffusion technique such as defined in Equation (1) requires that a reconstructed image u is function of both space and time. Thus, Equation (2) defines an original image $u_0$, which in turn defines each voxel at a predetermined initial time t=0.

$$u(x,y,z,t)_{t=0} = u_0 \tag{2}$$

where x, y and z respectively indicates a voxel coordinate in space. Similarly, Equation (3) defines any image u, which in turn defines each voxel at a predetermined time t≠0.

$$u(x,y,z,t)_{t\neq 0} = u \tag{3}$$

where x, y and z respectively indicates a voxel coordinate in space. In other words, Equation (2) defines a reconstructed image at an initial time while Equation (3) defines a reconstructed image at a subsequent time.

Furthermore, Equation (4) defines the Newmann boundary condition which means the derivative in the normal direction of the boundary is 0 and therefore avoids the energy loss on the image boundary during the diffusion process.

$$\delta_n u = 0 \tag{4}$$

The diffusion coefficient D is function of a parameter s as defined in Equations (5a) and (6).

$$D(s) = \frac{1}{1+(s/k)^2} \tag{5a}$$

$$s = |\nabla(G_\sigma u)| \tag{6}$$

where s is the magnitude of a local gradient of the smoothed u. As noted by $G_\sigma u$, a reconstructed image u is smoothed by a Gaussian filter G with standard deviation σ, k is a threshold or a predetermined value. If the magnitude of the local gradient s at a give pixel is smaller than the predetermined threshold value k, the pixel value is treated as noise. On the other hand, if the magnitude of the local gradient s at a given pixel is larger than the predetermined threshold value k, the pixel value is treated as a signal for the structures of interest such as lines or edges.

The predetermined threshold value k is determined based upon the following Equations (5b) and (5c):

$$k=k_0 d \tag{5b}$$

Generally, $k_0$ is set to 2 in Equation (5b) while d is determined as follows in Equation (5c).

$$d = \text{average of the gradient magnitude} \tag{5c}$$

Since the local magnitude of gradient s in Equation (5a) is varying from pixel to pixel, the local magnitude of gradient s is function of spatial positions. The gradient magnitude defined in (5c) is a single number for an entire reconstructed image.

The above described anisotropic diffusion technique generally works sufficiently well to reduce noise in and around large or relatively slow varying structures. Unfortunately, the above described anisotropic diffusion technique alone generally fails to provide detailed edges in and around small or relatively fast varying structures. In other words, the above described anisotropic diffusion technique generally smoothes the detailed or thin edges in and around the small or relatively fast varying structures to an extent that the edges are not sufficiently preserved as clinically significant marks. Consequently, the diffused images substantially lose necessary clinical information due to the conventional anisotropic diffusion technique.

To counterbalance the diffusing or smoothing effects on the reconstructed image during the denoising method using an anisotropic diffusion filter, embodiments of the current invention incorporates an adaptively weighted source term. The weighted source term is adapted for each instance of iteration and accordingly adjusts the diffused image for each instance of iteration. This approach is contrasted to weighting the finished diffused image at the completion of the iterative anisotropic diffusion. Consequently, embodiments of a denoising method and system using an adaptively weighted anisotropic diffusion filter according to the current invention bring some of the lost details of the image back into the diffused image during some instances of iteration of the anisotropic diffusion process in order to preserve clinically significant structures in reconstructed images.

The above defined anisotropic diffusion technique is used as an anisotropic diffusion filter or an anisotropic diffusion unit in the embodiments of the current invention. The above defined anisotropic diffusion is also used in an anisotropic diffusion step in the embodiments of the current invention. In either case, the anisotropic diffusion is generally implemented in an iterative manner. That is, the diffused image u is evaluated for a current instance of iteration, and the currently evaluated diffused image $u_t$ will be used as a previous diffused image $u_{t-1}$ in a next instance of iteration.

For each instance of iteration, the embodiments of the anisotropic diffusion filter or the anisotropic diffusion unit according to the current invention additionally weight the difference between the reconstructed image at the current instance and the original reconstructed image in an adaptive manner. By the same token, the steps of the anisotropic diffusion method or process according to the current invention also additionally weight the difference between the reconstructed image at the current instance and the original reconstructed image in an adaptive manner.

The adaptive weight term has been incorporated in the following Equations (7a), (7b) and (7c) which express the adaptive weighted anisotropic diffusion (AWAD) which is performed in the steps and by the embodiments of the current invention.

$$\frac{\partial u}{\partial t} = \nabla \cdot (D\nabla u) + W(u_0 - u) \tag{7a}$$

where W is an adaptive weight term. In discrete time format, Equation (7a) is optionally defines as in Equations (7b) and (7c) as follows:

$$\frac{u(t_{n+1}) - u(t_n)}{t_{n+1} - t_n} = \nabla \cdot (D\nabla u(t_n)) + W(u_0 - u(t_n)) \tag{7b}$$

$$u(t_{n+1}) = u(t_n) + (t_{n+1} - t_n)[\nabla \cdot (D\nabla u(t_n)) + W(u_0 - u(t_n))] \tag{7c}$$

The following descriptions of Equations (7a), (7b) and (7c) will be focused on the adaptive weight term since the basic concept of anisotropic diffusion has been already described with respect to Equations (1a), (1b) and (1c). The adaptive weight term W multiplies the temporally caused difference of the reconstructed images between the original reconstructed image before any diffusion and the result of the reconstructed image after the current diffusion. In Equation (7a), the above difference is expressed as $(u-u_0)$. In the discrete time format in Equations (7b) and (7c), the same difference is expressed $(u(t_n)-u_0)$.

The weight W in Equations (7a), (7b) and (7c) is implemented as time-variant or time-invariant while it is also spatially variant. In the following example as defined in Equation (8), the weight W is optionally illustrated as a time-invariant term. As defined in Equation (8), the weight term W is evaluated as a normalized value between 0 and 1.

$$W = 1 - e^{-|L(x,y,z)|} \tag{8}$$

where L is a predetermined edge map of the original image $u_0$. In one exemplary implementation, Laplacian of Gaussian is used. In other exemplary implementations, the edge map is produced by other edge detection methods such as Sobel edge detector (gradient of Gaussian), Curvature edge detector method or a combination of these known edge detection methods. For example, a Sobel edge detector is given in following two filtering masks as defined in Matrixes (8a):

$$\begin{matrix} -1 & -2 & -1 \\ 0 & 0 & 0 \\ 1 & 2 & 1 \end{matrix} \quad \text{and} \quad \begin{matrix} -1 & 0 & 1 \\ -2 & 0 & 2 \\ -1 & 0 & 1 \end{matrix} \tag{8a}$$

In one exemplary implementation using Laplacian of Gaussian as defined in Equations (9) and (10), the edge map based upon Laplacian of smoothed original image Δu, has certain advantage in simplicity and detecting sharper edges and its transit band. Furthermore, the edge map based upon Laplacian of smoothed original image $\Delta u_s$ reduces the slow-changed boundaries and uniform regions to zero-mean or near zero-mean.

$$L(x,y,z) = \Delta u_s(x,y,z) \quad (9)$$

$$u_s(x,y,z) = u_0(x,y,z) \otimes h(p,q,r) \quad (10)$$

where $u_s$ is the smoothed version of an original reconstructed image $u_0$ by a smoothing kernel h(p, q, r), which is optionally a simple running average filter or a Gaussian weighted smoothing filter.

Examples of a simple running average filter or a Gaussian weighted smoothing filter are formulated in the following Equations (11a) and (11b):

$$\text{Running Average: } h(p, q, r) = \frac{1}{z} \prod\left(\frac{p}{\tau_p}\right) \prod\left(\frac{q}{\tau_q}\right) \prod\left(\frac{p}{\tau_r}\right) \quad (11a)$$

$$\text{Gaussian Smoothing } h(p, q, r) = \frac{1}{Z} \exp\left(-\frac{p^2}{2\sigma_p^2} - \frac{q^2}{2\sigma_q^2} - \frac{r^2}{2\sigma_r^2}\right) \quad (11b)$$

where τ is the length of the running average filter and σ is the size parameter for Gaussian filters.

As described above, the anisotropically diffused image is adaptively weighted by the weight term which is the product of the normalized weight value W and the temporally caused difference of the reconstructed images between the original reconstructed image before any diffusion and the result of the reconstructed image after the current diffusion instance in iteration. In other words, the embodiments and the steps of the current invention adaptively weight the diffused image at every instance of iteration rather than at the completion of the iterative process.

Now referring to FIG. 2, a flow chart illustrates exemplary steps involved in the adaptively weighed anisotropic diffusion (AWAD) method or process according to the current invention. The following acts or tasks are performed by the above described embodiments including the processing unit 12 and the post-reconstruction processing unit 13. The AWAD method or process does not limit to these steps illustrated in the flow chart.

In one exemplary process of the AWAD, a step S10 generates an edge map of the original reconstructed image before any iteration of adaptively weighed anisotropic diffusion. Some aspects of the edge map generation have been previously described with respect to Equations (8a), (9), (10), (11a) and (11b). The edge map stores the weight values to be applied during each instance of iteration of the adaptively weighed anisotropic diffusion. In the above described example, the edge map generation is space-dependent but is time-invariant. That is, although the weight value is determined for a given pixel or a voxel as specified by a set of coordinates in the reconstructed image, the weight value is not varying for the given pixel or voxel over time in one embodiment. In another embodiment, the edge map is optionally generated to make the weight both spatially and temporary dependent.

The step S10 also involves some pre-processing of the original reconstructed image before the edge detection. As described above with respect to Equations (10), (11a) and (11b), an original reconstructed image $u_0$ is smoothed by a smoothing kernel such as h(p, q, r).

Lastly, the step S10 generates an edge map of certain characteristics. While the generated edge map provides the weight values in a weighting process, certain characteristics of a particular edge detector generally determine the weight values to be applied in the weighting step. For this reason, a selected edge detector partially affects an ultimate outcome of the adaptively weighed anisotropic diffusion process according to the current invention. The edge detectors include a variety of methods such as gradient map, Laplacian, curvature, Eigen values of structural tensors and Hessian matrices. The edge detector is alternatively implemented based upon a combination of the above detectors.

Still referring to FIG. 2, a step S20 performs a predetermined anisotropic diffusion process on the reconstructed image data such as a seed image according to the current invention. An exemplary step of the anisotropic diffusion process has been previously described with respect to Equations (1a), (1b), (1c), (2), (3), (4), (5a), (5b), (5c) and (6).

In a step S30, the anisotropic diffusion process weights the diffused result in the step S20 according to the current invention. The adaptive weighting is accomplished by tasks associated with Equations (7a), (7b), (7c) and (8). Equations (7a), (7b), (7c) includes terms associated with the anisotropic diffusion process itself and the adaptive weighting terms. Although the steps S20 and S30 are illustrated as two sequential steps in the exemplary flow chart, the adaptively weighted anisotropic diffusion process is implemented in a variety of ways according the current invention. In an alternative embodiment or process, the steps S20 and S30 are optionally implemented as simultaneous steps that may be performed in parallel. In any case, regardless of a particular implementation, the diffused result in the step S20 is weighted according to the adaptive weighting in the step S30 to generate an adaptively weighted result for each instance of the iteration. Equation (8) defines the normalized weight value W based upon the edge map that has been generated in the step S10.

As mentioned before with respect to the step S30, the adaptive weighted anisotropic diffusion according to the current invention is iteratively performed in one preferred process. In this regard, a step S40 determines as to whether or not the adaptive weighted anisotropic diffusion in the steps S20 and S30 should be terminated. If the step S40 determines that the adaptive weighted anisotropic diffusion in the steps S20 and S30 should be terminated, the illustrative steps end its process. On the other hand, if the step S40 determines that the adaptive weighted anisotropic diffusion in the steps S20 and S30 should not be terminated, the illustrative steps continue its process by iteratively performing the steps S20 and S30. As described with respect to Equations (7a), (7b) and (7c), the reconstructed image at a subsequent time $u(t_{n+1})$ is now assigned to the reconstructed image of a previous time $u(t_n)$ in the current instance of the iteration before a next instance of the iteration is performed.

In an alternative implementation, the step S30 has an optional step of applying a predetermined sharp source filter according to the current invention. Equations (12) and (13) define a process of adaptive weighted sharp source anisotropic diffusion (AWSSAD) according to the current invention.

$$\frac{\partial u}{\partial t} = \nabla \cdot (D \nabla u) + W(S(u_0) - u) \quad (12)$$

where $S(u_0)$ is the sharpened version $u_0$ using a predetermined unsharp filter as defined in Equation (13).

$$S(u_0) = \left( \frac{C}{2C-1} u_0 - \frac{1-C}{2C-1} u \right) \quad (13)$$

w is a parameter of unsharp filter. At C=0.8, reasonably good results have been obtained.

The step S40 determines as to whether or not the adaptively weighted anisotropic diffusion should be further iteratively performed based upon a predetermined set of termination conditions. Commonly, there are two ways to determine the number of iterations or the conditions for termination: One termination is based upon comparing the mean-square-errors between current iteration result and previous iteration result. If the difference is smaller than a preset termination value, the processing stops. The other termination is based upon a predetermined noise assessment tool to determine a noise level at each instance of the iteration. If the current noise level is reduced by a preset noise reduction goal such as a 50% noise level from the original, the iteration stops.

In one implementation of the adaptively weighted anisotropic diffusion process, if iterative methods are used to calculate an image at a specific scale t in the scale-space by choosing a specific $\Delta t$ and by performing $t/\Delta t$ iterations to calculate the diffused image result $u(t_{n+1})$ based upon the previous diffused image result $u(t_n)$ from a previous iteration, the step size $\Delta t$ is optionally determined according the following Equation (14) for stability.

$$\Delta t < 1/(2N) \quad (14)$$

where N is the number of dimensions of the reconstructed image. Based upon Equation (14), the value of $\Delta t$, which limits the upper bound of the step size. If the step size $\Delta t$ is too small, the adaptive weighted anisotropic diffusion process substantially slows down the overall denoising process. In one implementation, the step size $\Delta t$ is set approximately between $1/4 \sim 1$ of the upper bound. For example, the step size $\Delta t$ takes a value such as $1/8$, $1/12$ or $1/16$ for N=3 in denoising the 3D reconstructed images.

Figure 3B:
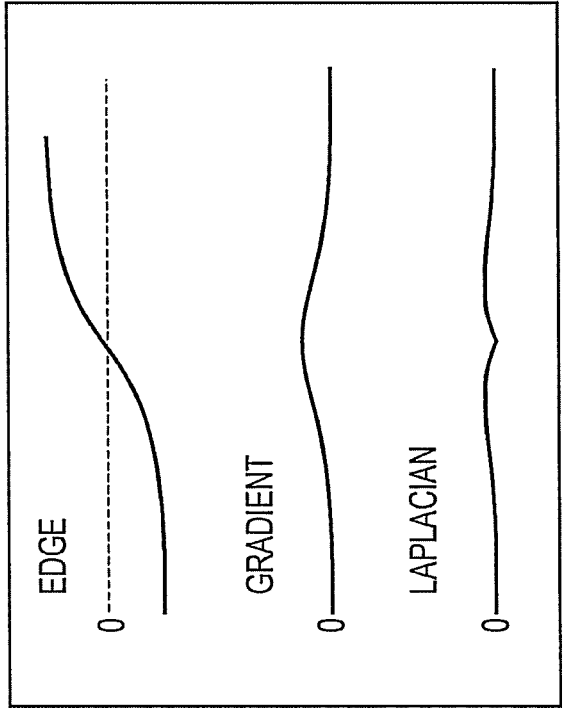
FIG. 3B is a diagram illustrating an intensity level corresponding to gradient and Laplacian for a certain slow edge.
Figure 3A:
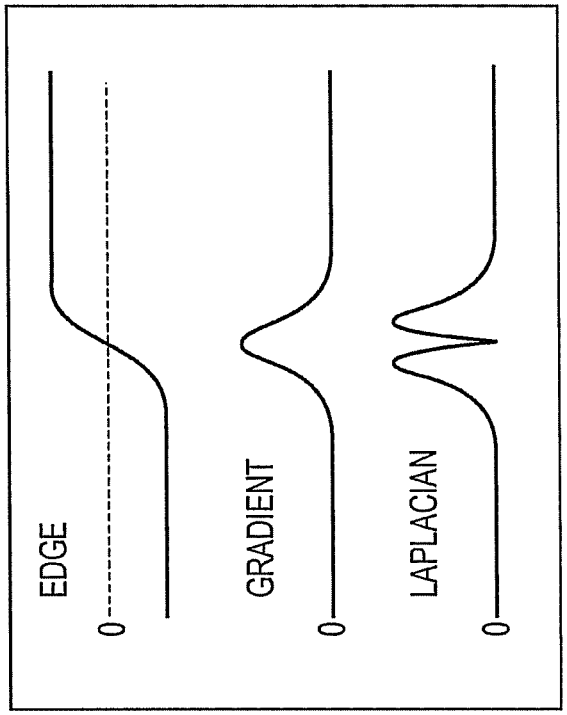
FIG. 3A is a diagram illustrating an intensity level corresponding to gradient and Laplacian for a certain sharp edge.

Now referring to FIGS. 3A and 3B, diagrams illustrate an intensity level corresponding to gradient and Laplacian for sharp and slow edges. As described above with respect to the step S10, an edge map is generated with certain characteristics according to a particular edge detector. In this regard, a selected edge detector partially affects an ultimate outcome of the adaptively weighed anisotropic diffusion process according to the current invention. In one implementation, an edge map is generated to emphasize small or sharp edges rather than thick or slow-varying edges or boundaries. One advantage of the adaptively weighted anisotropic diffusion is to retain small edges while the images are denoised. For this purpose, Laplacian is used in generating an edge map.

FIG. 3A, a diagram illustrates an intensity level corresponding to gradient and Laplacian for a certain sharp edge. A top graph illustrates an intensity level of an exemplary sharp edge. The intensity changes quickly across the zero intensity level. A middle graph illustrates a gradient level that corresponds to the top exemplary sharp edge. The gradient is at the highest level when the edge changes its intensity level from a negative value to a positive value at zero. A bottom graph illustrates an intensity level of Laplacian, which is a second order derivative in one dimensional case. For a rising edge or a falling edge of the exemplary sharp edge, a first order derivative gives either a positive upward bump or a negative downward bump. The peak or valley of the bump is the place where the first order derivative is at maximum in absolute value. The peak or valley of the first order derivative is actually the zeroes in second order derivative, and at two sides of the zeros, there are two bumps (one positive and one negative) in second order derivative or Laplacian. In one implementation, an absolute value of the second derivative is taken as the weight at edges so that more weight is given to the pixels within the band along the edges to preserve the edge information. Although the Laplacian weight at edge is zero, the edge pixels are substantially preserved by the anisotropic diffusion process. Only sharp edges have larger Laplacian values, and these edges are substantially preserved by using Laplacian weight values.

FIG. 3B, a diagram illustrates an intensity level corresponding to gradient and Laplacian for a certain slow edge. A top graph illustrates an intensity level of an exemplary slow edge. The intensity changes slowly across the zero intensity level in comparison to the top graph in FIG. 3A. A middle graph illustrates a gradient level that corresponds to the top exemplary slow edge. The gradient also changes slowly and with a less intensity level when the edge changes its intensity level from a negative value to a positive value at zero. A bottom graph illustrates an intensity level of Laplacian, which shows almost no change in the intensity level. In contrast to a sharp edge, slow varying edges or large edges having thick boundaries generally have small Laplacian values compared to the noise. For this reason, Laplacian is substantially ignored in one implementation.

Figure 4A:
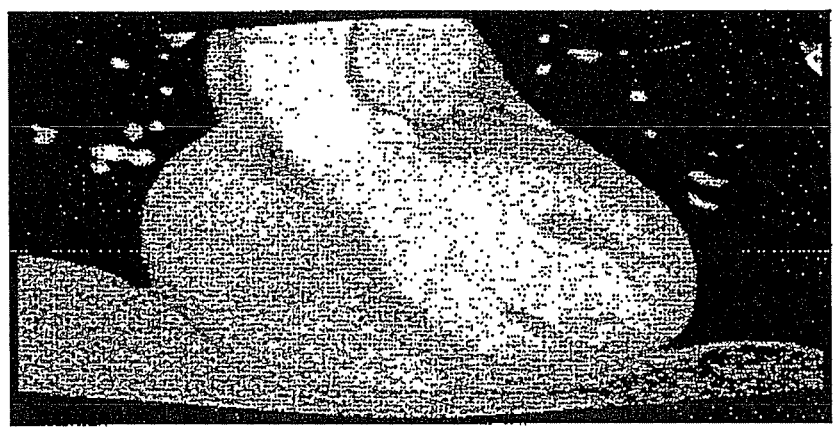
FIG. 4A is an original reconstructed image before the adaptively weighted anisotropic diffusion is applied.
Figure 4B:
FIG. 4B is a resulted diffused image that has gone through the adaptively weighted anisotropic diffusion (AWAD) according to the current invention.
Figure 4C:
FIG. 4C is a resulted diffused image that has gone through the adaptively weighted sharp source anisotropic diffusion (AWSSAD) according to the current invention.

FIGS. 4A, 4B and 4C illustrate some effects of the adaptively weighted anisotropic diffusion on an original image according to the current invention. FIG. 4A is an original reconstructed image before the adaptively weighted anisotropic diffusion is applied. FIG. 4B shows a resulted diffused image that has gone through the adaptively weighted anisotropic diffusion (AWAD) according to the current invention using a threshold coefficient=2 with number of iterations=4 and step size=$1/8$. FIG. 4C shows a resulted diffused image that has gone through the adaptively weighted sharp source anisotropic diffusion (AWSSAD) according to the current invention using threshold coefficient=2 with number of iterations=13, step size=$1/8$ and w=0.8.

In summary, the embodiments of the current invention apply a negative feedback mechanism to adjust the edge and texture features in a reconstructed image based upon the information in the original image so that the final result is a balanced, converged and featured image at a reduced level of noise.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope of the inventions.

What is claimed is:

1. A medical imaging apparatus comprising:
    a processing circuitry configured to execute anisotropic diffusion for medical image data comprising a plurality of signal values, each signal value corresponding to coordinates in a space, the processing circuitry also configured to generate a plurality of weights, wherein the weight for each signal value depends on an edge value corresponding to the coordinates of the respective signal value, wherein the processing circuitry repeatedly executes an anisotropic diffusion filter for the medical image data, the anisotropic diffusion filter includes a combination of an anisotropic diffusion term and an inhomogeneous term, the anisotropic diffusion term applies anisotropic diffusion to a current image, and the inhomogeneous term applies the weight to a difference between the current image and an initial image, wherein the anisotropic diffusion filter is given by $$u(t_{n+1})=u(t_n)+(t_{n+1})-(t_n)[\nabla \cdot (D\nabla u(t_n)-u_0)]$$

where $u(t_{n+1})$ is a signal value at the (n+1)th iteration, $u(t_n)$ is a signal value at the nth iteration, $u_0$ is an initial signal value before application of the anisotropic diffusion filter, D is a diffusion coefficient and W is a weight corresponding to the initial signal value.

2. The apparatus of claim 1, wherein the medical image data comprises volume data, and the signal value comprises a voxel value.

3. The apparatus of claim 1, wherein the inhomogeneous term in the anisotropic diffusion filter is a term that multiplies a difference between reference medical image data of the initial image and the medical image data smoothed by the anisotropic diffusion in a current instance in iteration by the weight for the signal value, the reference medical image data comprises medical image data before application of the anisotropic diffusion.

4. The apparatus of claim 1, wherein the processing circuitry is further configured to generate the weights by using Laplacian edge detection.

5. The apparatus of claim 1, wherein the processing circuitry is further configured to generate the weights by using Sobel edge detection.

6. The apparatus of claim 1, wherein the processing circuitry is further configured to generate the weights by using curvature edge detection.

7. The apparatus of claim 1, wherein the weight is invariant in the anisotropic diffusion repeated by a predetermined number of iterations.

8. The apparatus of claim 1, wherein the medical image data comprises medical image data smoothed in advance before the anisotropic diffusion.

9. The apparatus of claim 1, wherein the inhomogeneous term in the anisotropic diffusion filter is a term that multiplies a difference between reference medical image data of the initial image and the medical image data smoothed by the anisotropic diffusion in a current instance in iteration by the weight for the signal value, the reference medical image data comprises the medical image data sharpened based upon medical image data before the anisotropic diffusion and a predetermined parameter.

10. The apparatus of claim 9, wherein the sharpened medical image data is given by $$S(u_0) = \left( \frac{w}{2w-1} u_0 - \frac{1-w}{2w-1} u \right)$$

where $S(u_0)$ is a signal value of the sharpened medical image data, $u_0$ is an initial signal value before application of the anisotropic diffusion filter, u is a signal value at the nth iteration, and w is the predetermined parameter.

11. The apparatus of claim 1, wherein the processing circuitry is further configured to store a predetermined time scale, the anisotropic diffusion is executed at a specific time interval, and a predetermined number is a number obtained by multiplying the time scale by the specific time interval.

12. The apparatus of claim 11, wherein the specific time interval is smaller than a reciprocal of twice the number of dimensions of the medical image data.

13. A medical image processing method comprising:

providing medical image data comprising a plurality of signal values, each signal value corresponding to coordinates in a space;

generating a plurality of weights, wherein the weight for each signal value depends on an edge value corresponding to the coordinates of the respective signal value; and repeatedly executing an anisotropic diffusion filter for the medical image data, wherein the anisotropic diffusion filter includes a combination of an anisotropic diffusion term and an inhomogeneous term, the anisotropic diffusion term applies anisotropic diffusion to a current image, and the inhomogeneous term applies the weight to a difference between the current image and an initial image, wherein the anisotropic diffusion filter is given by $$u(t_{n+1})=u(t_n)+(t_{n+1})-(t_n)[\nabla \cdot (D\nabla u(t_n)-u_0)]$$

where u(tn+1) is a signal value at the (n+1)th iteration, u(tn) is a signal value at the nth iteration, u0 is an initial signal value before application of the anisotropic diffusion filter, D is a diffusion coefficient and W is a weight corresponding to the initial signal value.

* * * * *